United States Patent
Uchida

(10) Patent No.: US 9,535,169 B2
(45) Date of Patent: Jan. 3, 2017

(54) RADIATION DETECTOR

(75) Inventor: Hiroshi Uchida, Hamamatsu (JP)

(73) Assignee: HAMAMATSU PHOTONICS K.K., Hamamatsu-shi, Shizouka (JP)

(*) Notice: Subject to any disclaimer, the term of this patent is extended or adjusted under 35 U.S.C. 154(b) by 0 days.

(21) Appl. No.: 13/977,840

(22) PCT Filed: Nov. 25, 2011

(86) PCT No.: PCT/JP2011/077236
§ 371 (c)(1),
(2), (4) Date: Aug. 6, 2013

(87) PCT Pub. No.: WO2012/093526
PCT Pub. Date: Jul. 12, 2012

(65) Prior Publication Data
US 2013/0306876 A1 Nov. 21, 2013

(30) Foreign Application Priority Data
Jan. 4, 2011 (JP) .............. P2011-000198

(51) Int. Cl.
*G01T 1/20* (2006.01)
*G01T 1/164* (2006.01)
*G01T 1/29* (2006.01)

(52) U.S. Cl.
CPC .......... *G01T 1/2006* (2013.01); *G01T 1/1644* (2013.01); *G01T 1/2985* (2013.01)

(58) Field of Classification Search
CPC .... G01T 1/1642; G01T 1/2018; G01T 1/1644; G01T 1/2006; G01T 1/2985
(Continued)

(56) References Cited

U.S. PATENT DOCUMENTS 4,234,792 A * 11/1980 DeCou et al. ........... 250/370.09
4,415,808 A * 11/1983 Cusano et al. .............. 250/367
(Continued)

FOREIGN PATENT DOCUMENTS

JP 58-106482 A 6/1983
JP 63-75587 A 4/1988
(Continued)

OTHER PUBLICATIONS

I. Vilardi et al., "Optimization of the effective light attenuation length of YAP:Ce and LYSO:Ce crystals for a novel geometrical PET concept," Nuclear Instruments & Methods in Physics Research A 564, 2006, pp. 506-514.
(Continued)

*Primary Examiner* — David Porta
*Assistant Examiner* — Gisselle Gutierrez
(74) *Attorney, Agent, or Firm* — Drinker Biddle & Reath LLP

(57) ABSTRACT

Provided is a radiation detector that prevents a decline in detection efficiency as well as having excellent temporal characteristics. The radiation detector 1, which detects a radiation, includes a scintillator array 10 having a plurality of scintillator cells 11, a photodetector array 20 having a plurality of photodetectors 21, and a photodetector array 30 having a plurality of photodetectors 31. The plurality of photodetectors 21 and the plurality of photodetectors 31 are solid-state photodetectors that can transmit a gamma ray G1, G2. The scintillator cell 11 is separated into a plurality of light emitting regions 11a, 11b by a reflecting region 12, and the reflecting region 12 extends between the incident surface 10a side and the back surface 10b side along a surface SP that is inclined with respect to the incident surface 10a and the back surface 10b.

15 Claims, 9 Drawing Sheets

(58) Field of Classification Search
USPC .......................................................... 250/366
See application file for complete search history.

(56) References Cited

U.S. PATENT DOCUMENTS

| | | | |
|---|---|---|---|
| 5,012,103 A * | 4/1991 | Tanaka et al. | 250/368 |
| 2004/0140431 A1* | 7/2004 | Schmand et al. | 250/367 |
| 2009/0032717 A1* | 2/2009 | Aykac et al. | 250/367 |
| 2010/0127178 A1* | 5/2010 | Laurence et al. | 250/363.04 |

FOREIGN PATENT DOCUMENTS

| | | | | |
|---|---|---|---|---|
| JP | 2-118485 A | | 5/1990 | |
| JP | 04036686 A | * | 2/1992 | ............... G01T 1/20 |
| JP | 7-27864 A | | 1/1995 | |
| JP | 7-27865 A | | 1/1995 | |
| JP | 7-27866 A | | 1/1995 | |
| JP | 2006-179980 A | | 7/2006 | |
| JP | 2011-232197 A | | 11/2011 | |

OTHER PUBLICATIONS

J.S. Huber et al., "Characterization of a 64 Channel PET Detector Using Photodiodes for Crystal Identification," IEEE Transactions on Nuclear Science NS-44, 1997, pp. 1197-1201.

\* cited by examiner

RADIATION DETECTOR

TECHNICAL FIELD

The present invention relates to a radiation detector to be used for a positron emission tomography device (hereinafter, referred to as a "PET device").

BACKGROUND ART

Patent Literatures 1 to 2 disclose radiation detectors that increase the efficiency for detecting scintillation light, and improve the sharpness of radiation images. Non-Patent Literature 1 discloses a detector to be used for a PET device. The efficiency for detecting scintillation light means the efficiency for collecting scintillation light, and means the rate of scintillation light that could be captured by a photodetector out of scintillation light generated in a scintillator.

The radiation detector of Patent Literature 1 has a configuration for which a solid-state photodetector is laminated between two scintillators. X-rays transmitted through a subject are irradiated onto the radiation detector. One scintillator emits visible light of an intensity according to the intensity of the irradiated X-rays. The visible light is converted into an image signal. X-rays that have not been converted to visible light are transmitted through the solid-state photodetector to reach the other scintillator. The other scintillator emits visible light of an intensity according to the intensity of the X-rays reached. The visible light is converted into an image signal by the respective solid-state photodetector elements.

The radiation detector of Patent Literature 2 has a configuration for which a planar scintillator is laminated sandwiched from the front and back between two solid-state photodetectors. X-rays transmitted through a subject are irradiated onto the radiation detector. The X-rays are transmitted through the solid-state photodetector and irradiated onto the scintillator. The scintillator emits visible light of an intensity according to the intensity of the irradiated X-rays. Visible light that is emitted to the side on which X-rays have been made incident is converted into an image signal by one solid-state photodetector. Visible light that is emitted in an opposite direction thereto is converted into an image signal by the other solid-state photodetector.

Patent Literature 3 discloses an imaging device capable of performing at high resolution imaging for scintillation light that is emitted in a scintillator. The imaging device of Patent Literature 3 includes a scintillator that emits scintillation light in response to incident energy beams and a first CCD section and a second CCD section that take an image by the scintillation light. The first CCD section and the second CCD section are disposed so that their respective imaging units face each other, and the scintillator is disposed so as to be sandwiched between the two imaging units and be overlapped in a plane view with these two imaging units.

The radiation detector of Patent Literature 4 has a scintillator on which X-rays are incident and a solid-state photodetector which detects scintillation light that is emitted from this scintillator. The scintillator emits visible light of an intensity according to the intensity of the X-rays. The visible light is photoelectrically converted into an image signal.

Patent Literature 5 discloses a positron CT device that is capable of making a positron distribution into an image uniformly and at high resolution across the entire visual field by preventing deterioration in position resolution in a peripheral visual field. For the positron CT device of Patent Literature 5, a plurality of detector units each consisting of a scintillator bundle for which columnar scintillator elements are bundled and position detection-type photodetectors coupled to both ends of the scintillator bundle are arranged in a ring shape, and a rough ground portion is provided at a part of a surface other than joint surfaces of each scintillator element with the photodetectors.

Patent Literature 6 discloses a radiation detector that is capable of efficiently guiding light generated in a scintillator to a photodetector. For the radiation detector of Patent Literature 6, the scintillator has a light output surface formed in a wedge shape, and a light input surface of a light guide is formed in a V-shape that receives the wedge shape.

CITATION LIST

Patent Literature

Patent Literature 1: Japanese Patent Application Laid-Open No. H07-27865
Patent Literature 2: Japanese Patent Application Laid-Open No. H07-27866
Patent Literature 3: Japanese Patent Application Laid-Open No. 2006-179980
Patent Literature 4: Japanese Patent Application Laid-Open No. H07-27864
Patent Literature 5: Japanese Patent Application Laid-Open No. S63-75587
Patent Literature 6: Japanese Patent Application Laid-Open No. H02-118485

Non Patent Literature

Non-Patent Literature 1: J. S. Huber et al., Characterization of a 64 Channel PET Detector Using Photodiodes for Crystal Identification, IEEE Transaction on Nuclear Science NS-44, pp. 1197-1201, 1997
Non-Patent Literature 2: I. Vilardi et al., Optimization of the effective light attenuation length of YAP: Ce and LYSO: Ce crystals for a novel geometrical PET concept, nuclear instruments and methods in physics research A, 2006

SUMMARY OF INVENTION

Technical Problem

In radiation detectors to be used for a PET device using a time-of-flight difference between two radiations (a Time-of-Flight-PET device: hereinafter, referred to as a "TOF-PET device"), when a radiation pair generated by electron-positron pair annihilation is detected by two radiation detectors, the temporal resolution (temporal characteristics) that is the accuracy of measuring a difference in time of detection is an important factor. For conventional radiation detectors, scintillator detectors having slender rectangular parallelepiped scintillators have been used from the viewpoint of position detection characteristics and detection efficiency. The position detection characteristics mean characteristics of detecting the position of scintillators where gamma rays have been detected in a PET device. On the other hand, the detection efficiency means the efficiency of detecting gamma rays, and means the rate of gamma rays, out of gamma rays incident on scintillators, that have imparted a certain amount of energy to the scintillators by interaction (photoelectric effect, Compton scattering, etc.) with the scintillators. In addition, there is a proportional relationship between the energy amount by which gamma rays have been absorbed and generated scintillation light. As methods for improving the temporal characteristics, methods such as reducing the length of scintillators and setting the shapes of scintillators to, for example, truncated pyramid shapes or wedge shapes can be mentioned. However, according to such a method, a reduction in the volume of scintillators occurs. Because the detection efficiency is dependent on the volume of scintillators, a reduction in the volume of scintillators causes a decline in detection efficiency. Therefore, it is an object of the present invention to provide a radiation detector by which excellent temporal characteristics are realized without a decline in detection efficiency.

Solution to Problem

A radiation detector of an aspect of the present invention is a radiation detector which detects a radiation, and includes a scintillator array having an incident surface on which a radiation is incident, a back surface located on a side opposite to the incident surface, and a plurality of scintillator cells which are arrayed two-dimensionally on the incident surface, a first photodetector array which is provided on the incident surface, and a second photodetector array which is provided on the back surface. The scintillator array is provided between the first photodetector array and the second photodetector array, the first photodetector array has a plurality of first photodetectors which are arrayed two-dimensionally along the incident surface, the second photodetector array has a plurality of second photodetectors which are arrayed two-dimensionally along the back surface, the pluralities of first and second photodetectors are photodetectors which can transmit a radiation, the plurality of scintillator cells include a plurality of light emitting regions which absorb an incident radiation and generate scintillation light and a first reflecting region which reflects the scintillation light, the scintillator cell extends between the incident surface and the back surface, and is separated into the plurality of light emitting regions by the first reflecting region, the first reflecting region extends between the incident surface side and the back surface side along a surface which is inclined with respect to the incident surface and the back surface, and each of the plurality of light emitting regions is optically coupled to either one of the first photodetector and the second photodetector.

The first reflecting region of the radiation detector thus extends, along a surface that is inclined with respect to the incident surface and the back surface, between the incident surface side and the back surface side. For this reason, a light emitting region is provided on the incident surface side or the back surface side by the first reflecting region, so that the temporal characteristics are improved as compared with a configuration for which no first reflecting region is provided in the scintillator cell. Further, the scintillator cell is separated into a plurality of light emitting regions by the first reflecting region. That is, for the scintillator cell, it becomes possible to maintain a substantial volume of the plurality of light emitting regions added up. Therefore, a decline in detection efficiency due to a reduction in volume of the light emitting region can be suppressed. Consequently, a radiation detector having excellent temporal characteristics can be provided without a decline in detection efficiency. Further, because the scintillator cells can be considered to have a two-stage arrangement in the radial direction of a detector ring (a detector ring of a PET device), it becomes possible to collect DOI information (DOI: Depth Of Interaction). Further, because it can be considered that two scintillator cells are present shifted in the circumferential direction of a detector ring (a detector ring of a PET device), the sampling density can be improved.

In the radiation detector of an aspect of the present invention, the light emitting region may have an end face and a tip located on a side opposite to the end face, the light emitting region may have a shape tapering from the end face toward the tip, and the end face may be included in the incident surface or the back surface, and optically coupled with either one of the first photodetector and the second photodetector. A rectangular parallelepiped scintillator has a plurality of sets of mutually parallel side surfaces. In such a configuration, when it becomes a condition such that scintillation light reflects between the mutually parallel side surfaces, reflection at the same reflection angle is repeated. Therefore, the arrival path to the photodetector is elongated to have a large variation in arrival time depending on the difference in the path. Particularly, in the case of a condition such that scintillation light reflects on the incident surface of the photodetector, reflection in the scintillator under this condition is repeated until the scintillation light has attenuated due to absorption and reflection loss in the scintillator. On the other hand, the light emitting region included in the radiation detector of the present invention is arranged so that one of the side surfaces that compose the light emitting region becomes a sloping surface inclined to the photodetector side. Such an arrangement breaks the continuous reflection condition that can possibly occur in a rectangular parallelepiped scintillator. Moreover, the incident angle on the incident surface of the photodetector has a deeper angle. That is, the incident angle of scintillation light shifts to a nearly vertical angle with respect to the incident surface. Accordingly, the rate of scintillation light that is reflected on the incident surface of the photodetector is reduced to make the arrival path shorter and reduce variation in arrival time, so that the radiation detector of the present invention can have excellent temporal characteristics.

In the radiation detector of an aspect of the present invention, the scintillator array may have a side surface and a second reflecting region which reflects the scintillation light, the side surface may extend between the incident surface and the back surface, and the second reflecting region may have a first part which is located on the side surface to cover the side surface and a second part which separates the scintillator array into the plurality of scintillator cells. Thus, on the side surface of the scintillator array, there may be provided a first part in the second reflecting region. This makes it possible to efficiently collect scintillation light generated in the scintillator cells into the photodetectors. Therefore, the radiation detector by the present invention can have excellent energy detection characteristics (energy resolution). Further, the scintillator array may have a second part in the second reflecting region to separate the scintillator array into a plurality of scintillator cells. Accordingly, it becomes possible to prevent leakage of scintillation light to a different scintillator cell adjacent to a scintillator cell in which the scintillation light has been generated. Therefore, the radiation detector by the present invention can have excellent position detection characteristics.

Advantageous Effects of Invention

The radiation detector by an aspect of the present invention allows providing a radiation detector by which excellent temporal characteristics are realized without a decline in detection efficiency.

DESCRIPTION OF EMBODIMENTS

Hereinafter, preferred embodiments will be described in detail with reference to the drawings. Also, the same elements are denoted with the same reference signs in the description of the drawings, and overlapping description is sometimes omitted.

Figure 1:
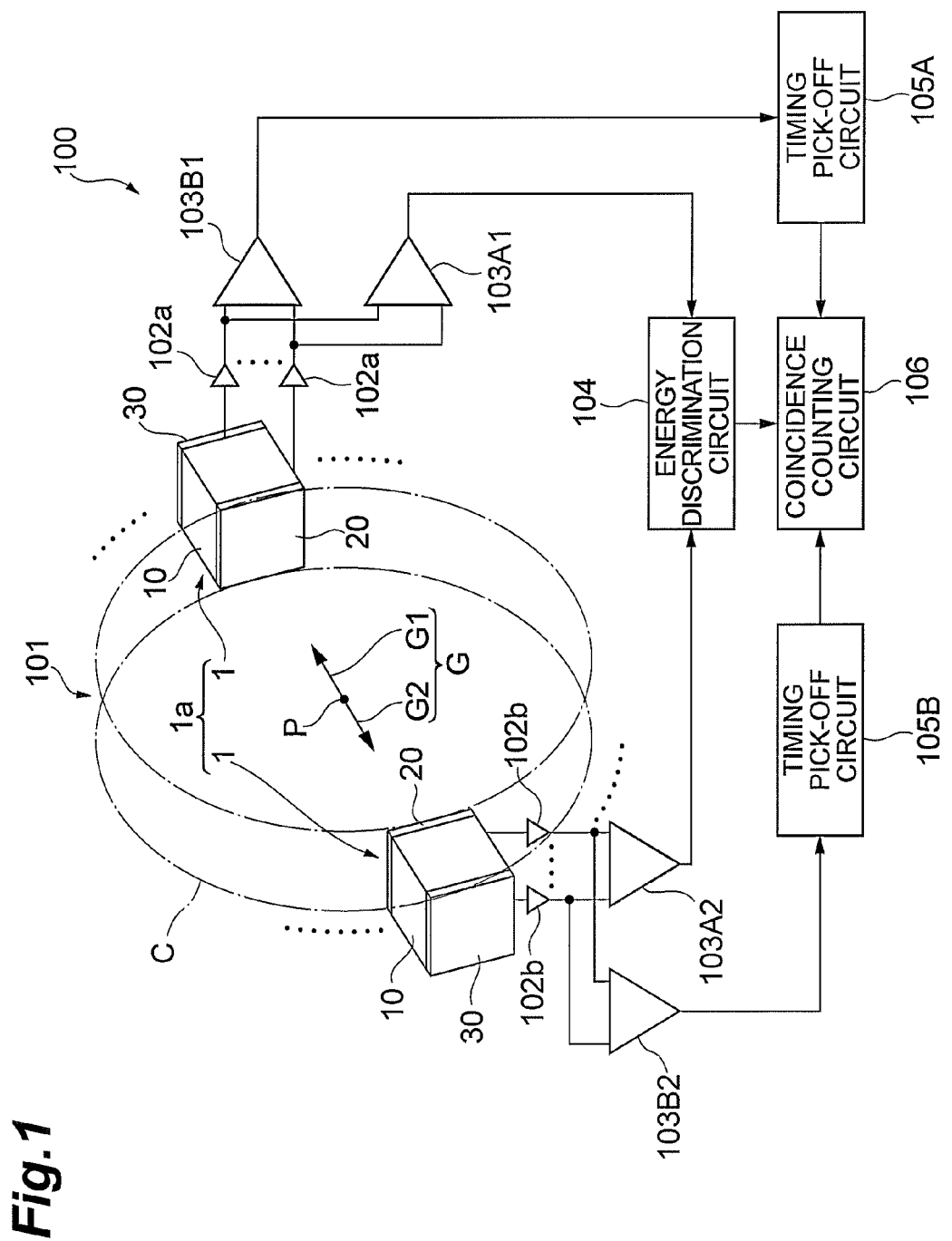
FIG. 1 is a diagram for explaining a configuration of a TOF-PET device according to the present embodiment.

First, description will be given with reference to FIG. 1 of a configuration of a TOF-PET device 100 in which radiation detectors 1 of the present embodiment are used. The TOF-PET device 100 is for administering a substance containing positron emitting nuclides to a human body or an animal, a plant, or the like and measuring a radiation pair generated by electron-positron pair annihilation in that measuring object P to thereby obtain information on a distribution or motion of the administered substance in the measuring object P. The TOP PET TOF-PET device 100 includes a radiation detector array 101, a plurality of preamplifiers 102a, 102b, a plurality of summing amplifiers 103A1, 103A2, 103B 1, 103B2, an energy discrimination circuit 104, timing pick-off circuits 105A, 105B, and a coincidence counting circuit 106. Moreover, in the TOF-PET device 100, there is disposed a measuring object P substantially at the center of the radiation detector array 101. From the measuring object P, a gamma ray pair G is radiated. The gamma ray pair G contains gamma rays G1, G2 to be radiated in mutually opposite directions. The term "radiation" means a gamma ray G1, G2 in the present embodiment.

The radiation detector array 101 has a plurality of radiation detectors 1 disposed on the circumference of a circle C substantially centered on the measuring object P. The radiation detector array 101 has a radiation detector set 1a composed of two radiation detectors 1 that perform coincidence counting. The radiation detector set 1a that performs coincidence counting is composed of a radiation detector 1 and another or other radiation detectors 1 located on the opposite side to the radiation detector 1.

The radiation detector 1 includes a scintillator array 10, a photodetector array 20, and a photodetector array 30. The details of the radiation detector 1 will be described later.

One radiation detector 1 of the radiation detector set 1a is connected to a plurality of preamplifiers 102a, and each of the preamplifiers 102a is connected to both of the summing amplifier 103A1 and the summing amplifier 103B1 in any case. The other radiation detector 1 of the radiation detector set 1a is connected to a plurality of preamplifiers 102b, and each of the preamplifiers 102b is connected to both of the summing amplifier 103A2 and the summing amplifier 103B2 in any case. Each of the preamplifiers 102a, 102b is connected in one to one correspondence with each of the pluralities of photodetectors (photodetectors 21, 31 to be described later) contained in the radiation detectors 1 of the radiation detector set 1a. The preamplifiers 102a, 102b amplify at high speed signals input from the photodetectors.

The summing amplifier 103A1 is connected to the plurality of preamplifiers 102a. The summing amplifier 103A2 is connected to the plurality of preamplifiers 102b. The summing amplifier 103B1 is connected to the plurality of preamplifiers 102a. The summing amplifier 103B2 is connected to the plurality of preamplifiers 102b. The summing amplifiers 103A1, 103A2, 103B1, 103B2 output logical sums of signals input from the preamplifiers 102a, 102b.

The energy discrimination circuit 104 is connected to the summing amplifiers 103A1, 103A2. The energy discrimination circuit 104 discriminates a signal not less than a predetermined threshold (hereinafter, referred to as a threshold SH) as a signal due to incidence of the gamma ray G1, G2, and outputs the discrimination result to the coincidence counting circuit 106. The threshold SH is set to, for example, around 511 keV, which is the photon energy of gamma rays G1, G2 that are generated with electron-positron pair annihilation. Accordingly, an electrical noise signal, a noise signal caused by a scattering gamma ray(s) (which is a gamma ray(s) for which one or both of the annihilation gamma rays have been changed in direction by a scattering substance, and have been reduced in energy due to scattering), and the like are eliminated. Also, the energy discrimination circuit 104 includes a circuit that integrates signals output from the preamplifiers 102a, 102b via the summing amplifiers 103A1, 103A2 and shapes the waveform so that the amplitude has a proportional relationship with energy.

The timing pick-off circuit 105A is connected to the summing amplifier 103B1. The timing pick-off circuit 105A, based on a signal output from the summing amplifier 103B1, outputs a signal (a first timing signal to be described later) for input to the coincidence counting circuit 106. On the other hand, the other timing pick-off circuit 105B is connected to the other summing amplifier 103B2. The timing pick-off circuit 105B, based on a signal output from the summing amplifier 103B2, outputs a signal (a second timing signal to be described later) for input to the coincidence counting circuit 106. In addition, as the timing pick-off method, a leading-edge method or a constant-fraction method is used.

The coincidence counting circuit 106 is connected to the energy discrimination circuit 104, the timing pick-off circuit 105A, and the timing pick-off circuit 105B. The coincidence counting circuit 106 determines whether the gamma ray pair G detected by the radiation detector set 1a is a gamma ray pair G generated with the same electron-positron pair annihilation. This determination is made based on whether a gamma ray G2 is detected in one radiation detector 1 of the radiation detector set 1a in a certain time period before and after a detection time where a gamma ray G1 is detected in the other radiation detector 1 of the radiation detector set 1a.

Then, description will be given of the operation of the TOF-PET device 100 shown in FIG. 1. The gamma rays G1, G2 of a gamma ray pair G generated with electron-positron pair annihilation in the measuring object P are detected by the radiation detector set 1a disposed in the traveling directions of the gamma ray pair G. Detection signals output from the respective radiation detectors 1 of the radiation detector set 1a are amplified by the preamplifiers 102a, 102b connected to the radiation detector set 1a, and then subjected to OR operations by the summing amplifiers 103A1, 103A2, and this operation result is output to the energy discrimination circuit 104.

A detection signal output from one radiation detector 1 of the radiation detector set 1a is amplified by the preamplifier 102a connected to this radiation detector 1, and then subjected to an OR operation by the summing amplifier 103B1 connected to this preamplifier 102a, and this operation result is output to the timing pick-off circuit 105A. A detection signal output from the other radiation detector 1 of the radiation detector set 1a is amplified by the preamplifier 102b connected to this radiation detector 1, and then subjected to an OR operation by the summing amplifier 103B2 connected to this preamplifier 102b, and this operation result is output to the timing pick-off circuit 105B.

The energy discrimination circuit 104 determines whether the signals input from the summing amplifiers 103A1, 103A2 are signals due to gamma rays G1, G2 having energy not less than the threshold SH, and outputs the determination result to the coincidence counting circuit 106.

The respective timing pick-off circuits 105A, 105B generate a first timing signal and a second timing signal, respectively, based on signals input from the respective summing amplifiers 103B1, 103B2, and output the first and second timing signals to the coincidence counting circuit 106. The coincidence counting circuit 106 determines based on the first timing signal and the second timing signal whether the detected signals are ones due to a gamma ray pair G generated with electron-positron pair annihilation. Out of the signals determined by the energy discrimination circuit 104 to have energy levels not less than the threshold SH, signals determined by the coincidence counting circuit 106 as ones due to a gamma ray pair G generated with electron-positron pair annihilation are used as real data.

Figure 2:
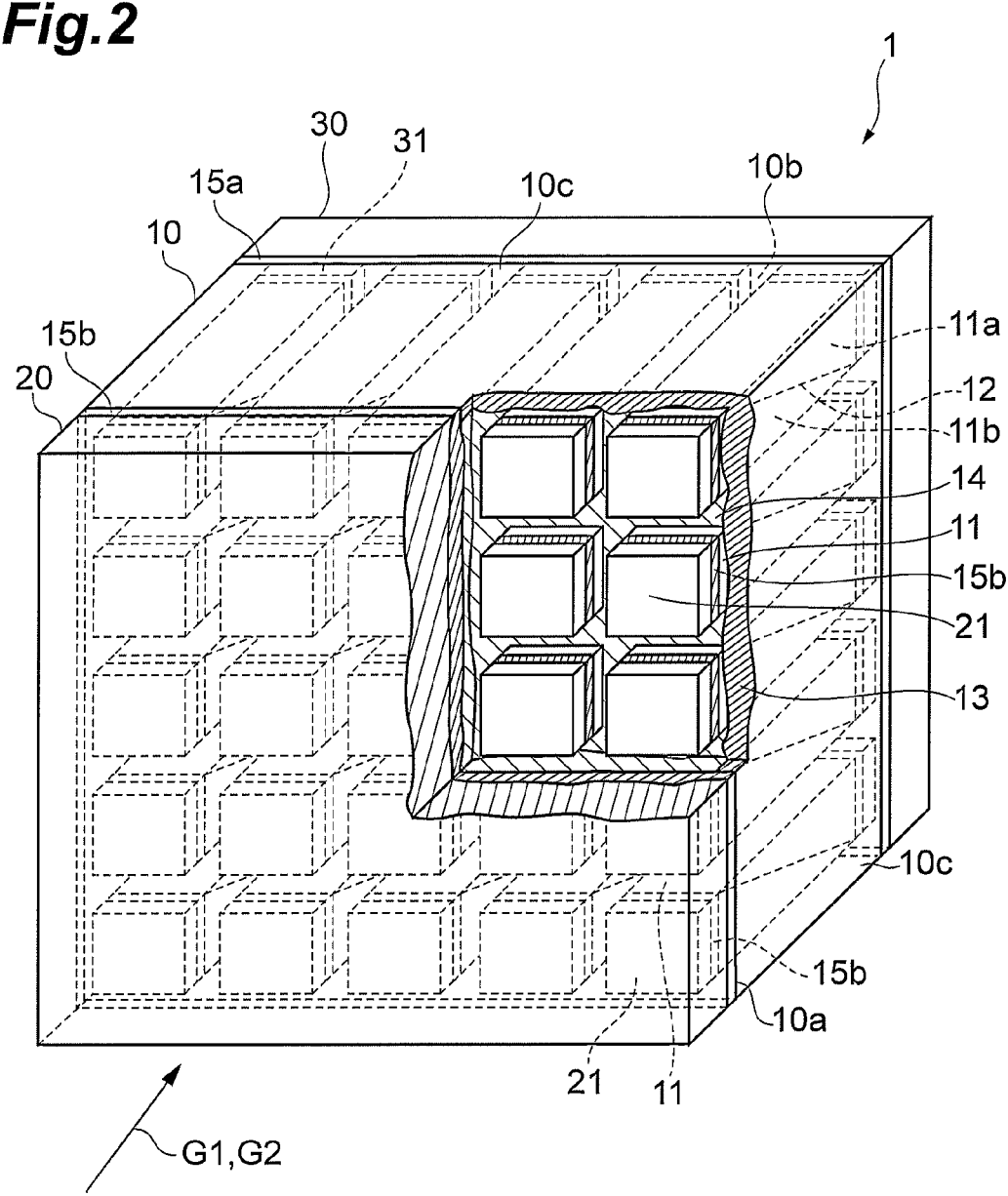
FIG. 2 is a view for explaining a configuration of a radiation detector according to the present embodiment.
Figure 3:
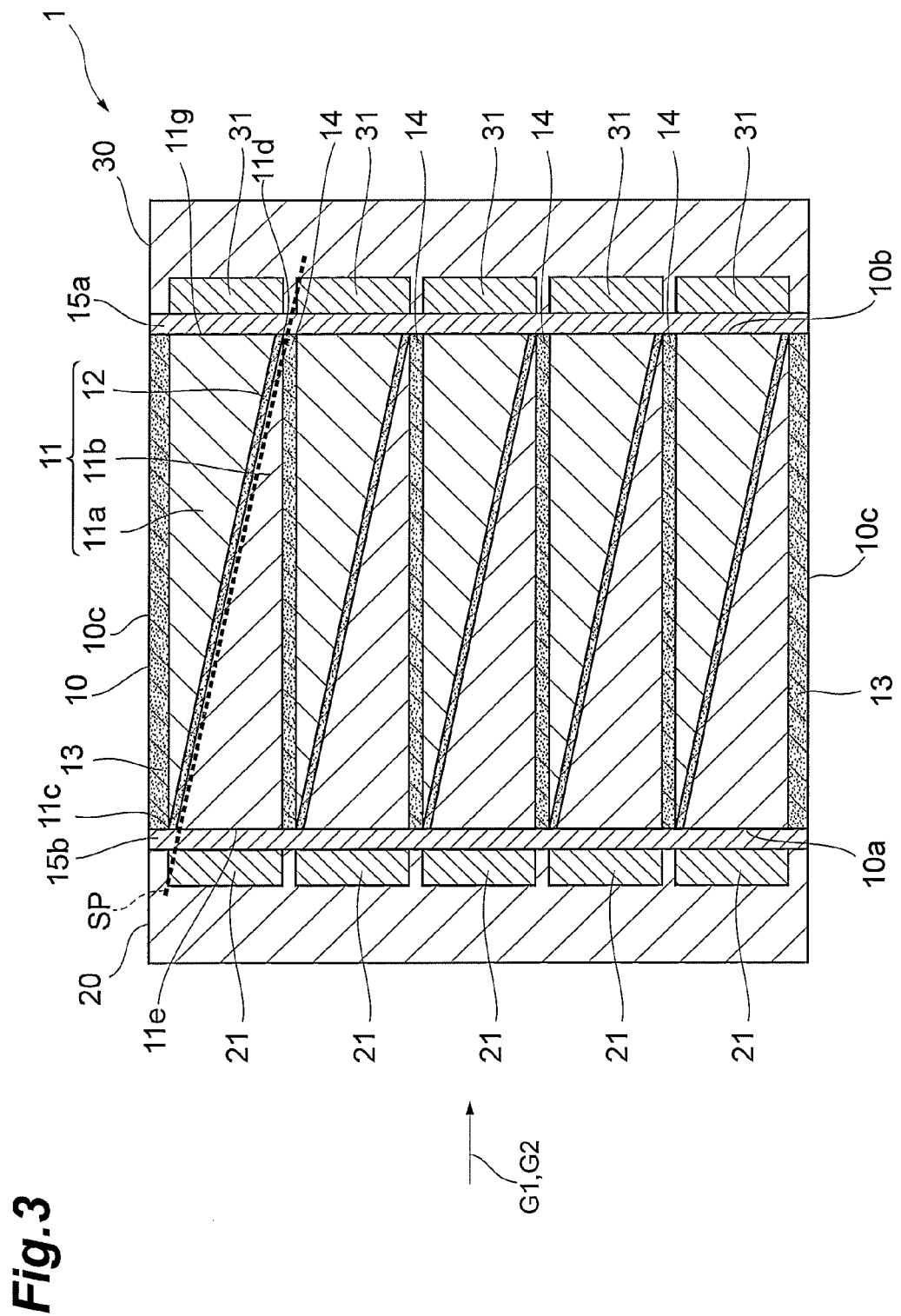
FIG. 3 is a view for explaining a section of the configuration of a radiation detector according to the present embodiment.
Figure 4:
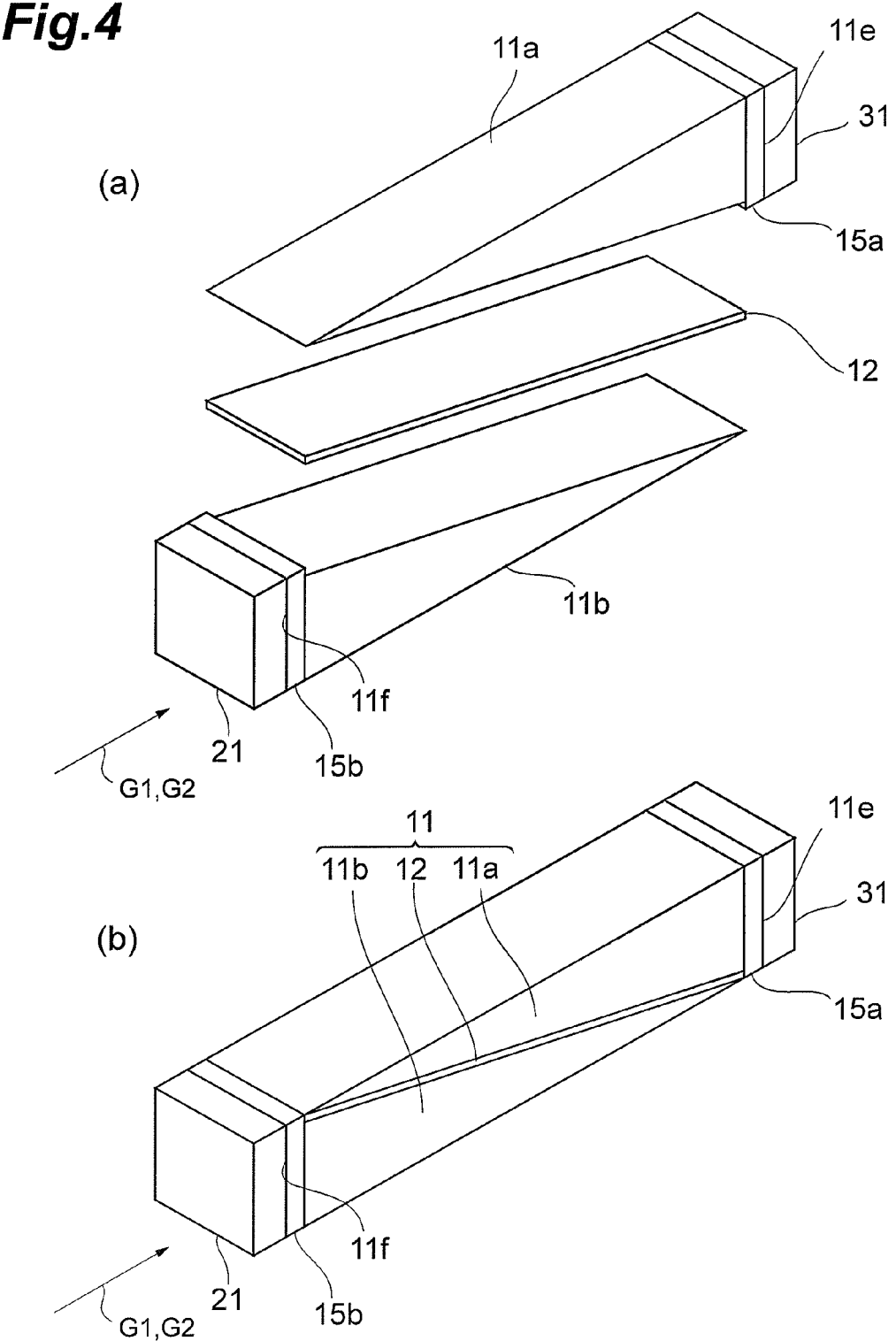
FIG. 4 includes views for explaining the configuration of a radiation detector according to the present embodiment.

Next, the radiation detector 1 according to the present embodiment will be described in detail by using FIG. 2 to FIG. 4. As shown in FIG. 2 to FIG. 4, the radiation detector 1 according to the present embodiment has a scintillator array 10, optical coupling portions 15a, 15b, a photodetector array 20, and a photodetector array 30.

The scintillator array 10 has an outer shape like a rectangular parallelepiped as a whole. The scintillator array 10 has an incident surface 10a, a back surface 10b, a side surface 10c, a plurality of scintillator cells 11, and reflecting regions 13, 14. The reflecting regions 13, 14 are first and second parts of a reflecting region of the scintillator array 10. The incident surface 10a is a surface on which a gamma ray G1, G2 is made incident. The back surface 10b is a surface located on the opposite side to the incident surface 10a. The side surface 10c is a surface extending between the incident surface 10a and the back surface 10b.

The scintillator cells 11 are arranged in a plural number two-dimensionally on the incident surface 10a. Moreover, each scintillator cell 11 has a slender rectangular parallelepiped-like shape. Each scintillator cell 11 has light emitting regions 11a, 11b and a reflecting region 12.

The light emitting region 11a has an end face 11g and a tip portion 11c located on the opposite side to the end face 11g. The light emitting region 11a has a shape tapering from the end face 11g toward the tip portion 11c, for example, a wedge shape. The end face 11g is optically coupled to the photodetector 31 via the optical coupling portion 15a.

The light emitting region 11b has an end face 11e and a tip portion 11d located on the opposite side to the end face 11e. The light emitting region 11b has a shape tapering from the end face 11e toward the tip portion 11d, for example, a wedge shape. The end face 11e is optically coupled to the photodetector 21 via the optical coupling portion 15b.

The light emitting region 11a, 11b absorbs the incident gamma ray G1, G2, and generates scintillation light. This light emitting region 11a, 11b contains any of, for example, crystals of $Bi_4Ge_3O_{12}$ (BGO), crystals of $Lu_2SiO_5$ (LSO) doped with Ce, crystals of $Lu_{2(1-X)}Y_{2X}SiO_5$ (LYSO), crystals of $Gd_2SiO_5$ (GSO), crystals of $Lu_3Al_5O_{12}$ (LuAG) doped with Pr, crystals of $LaBr_3$ ($LaBr_3$) doped with Ce, crystals of $LaCl_3$ ($LaCl_3$) doped with Ce, and crystals of $Lu_{0.7}Y_{0.3}AlO_3$ (LuYAP) doped with Ce.

The reflecting region 12 (first reflecting region) extends, along a surface SP that is inclined with respect to the incident surface 10a and the back surface 10b, between the incident surface 10a side and the back surface 10b side. The reflecting region 12 separates the scintillator cell 11 into the light emitting region 11a and the light emitting region 11b. Moreover, the reflecting region 12 can contain any of, for example, a Teflon tape (Teflon is a registered trademark), barium sulfate, aluminum oxide, titanium oxide, an ESR (Enhanced Specular Reflector) film, and a polyester film.

The photodetector array 20 detects scintillation light generated in the light emitting region 11b. The photodetector array 20 is optically coupled via the optical coupling portion 15b to the incident surface 10a of the scintillator array 10. For the optical coupling portion 15b, any of, for example, silicone grease, a silicone-based RTV rubber, a high-transmission adhesive sheet, can be used. The photodetector array 20 has a plurality of photodetectors 21. The plurality of photodetectors 21 are arranged two-dimensionally on the incident surface 10a. The plurality of photodetectors 21 are solid-state photodetectors that can transmit a gamma ray G1, G2, and are semiconductor photodetectors such as, for example, MPPCs (Multi-Pixel Photon Counters, registered trademark). The MPPC is a photo-counting device containing multiple pixels of Geiger-mode avalanche photodiodes (APDs).

The photodetector array 30 detects scintillation light generated in the light emitting region 11a. The photodetector array 30 is optically coupled via the optical coupling portion 15a to the back surface 10b of the scintillator array 10. The optical coupling portion 15a can have the same material as that of the above-described optical coupling portion 15b. The photodetector array 30 has a plurality of photodetectors 31. The plurality of photodetectors 31 are arranged two-dimensionally on the back surface 10b. The plurality of photodetectors 31 are semiconductor photodetectors such as, for example, MPPCs, which are the same as the above-described photodetectors 21.

As shown in FIG. 3, the reflecting regions 13, 14 collect scintillation light generated in the scintillator cell 11 into the photodetector 21 or photodetector 31 optically coupled with this scintillator cell 11, as well as prevents the scintillation light from leaking to the outside of the scintillator cell 11. The reflecting region 13 is provided on the side surface 10c, and covers substantially the entire area of the side surface 10c. The reflecting region 14 extends between the incident surface 10a and the back surface 10b. The reflecting region 14 is formed in a lattice pattern when viewed from the incident direction of a gamma ray G1, G2, and separates the plurality of scintillator cells 11 from each other. Moreover, the reflecting regions 13, 14 can have the same material as that of the above-described reflecting region 12.

Figure 5:
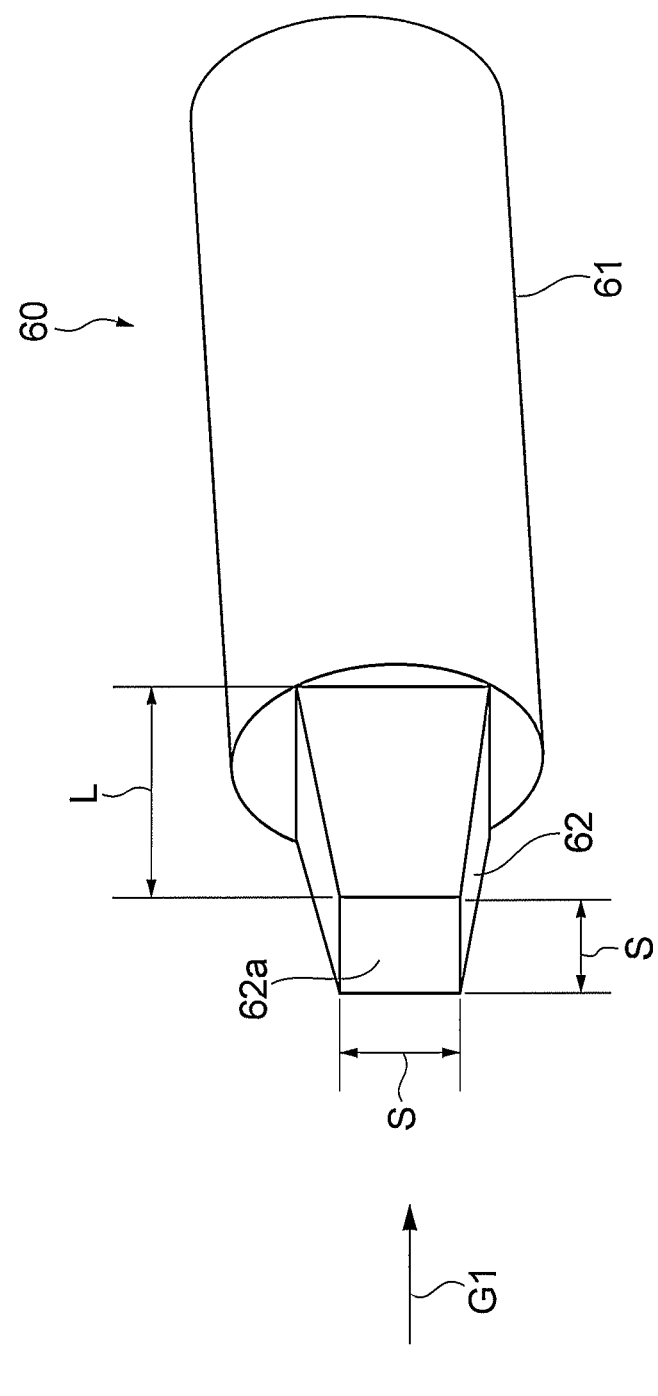
FIG. 5 is a view showing a configuration of a conventional radiation detector.

Next, the relationships of the temporal characteristics and detection efficiency with respect to the shapes of scintillators will be described in detail by using FIG. 5 and FIG. 6. FIG. 5 is a view showing a configuration of a radiation detector 60 used for obtaining the relationships between the scintillator shape and the temporal characteristics and detection efficiency shown in FIG. 6. The radiation detector 60 includes a photodetector 61 and a truncated pyramid-shaped scintillator 62. The scintillator 62 has an incident surface 62a on which a radiation G1 is incident and a back surface that is located on the opposite side to the incident surface 62a and has an area larger than that of the incident surface 62a. The photodetector 61 is provided on the back surface of the scintillator 62. The scintillator 62 has a truncated pyramid shape the length of which is L (the length in the incident direction of a radiation G1) and the incident surface 62a of which is S on a side.

Next, a method for measuring the relationships of the temporal characteristics and detection efficiency with respect to the shapes of scintillators will be described. First, the radiation detector 60 shown in FIG. 5 is prepared twice. The radiation detectors 60 are disposed across a $^{22}$Na positron source so that their respective incident surfaces 62a are opposed to each other. This disposition condition is maintained, while the scintillators having respective shapes are both simultaneously replaced with scintillators having the same shapes, and the temporal characteristics and detection efficiency of the scintillator in each shape are measured.

The method for measuring temporal characteristics will be described in detail. An output signal of one radiation detector 60 is set as a start signal, and an output signal of the other radiation detector 60 is set as a stop signal. The stop signal is delayed by a certain time so as to cause the start signal to be output always earlier than the stop signal. A pair of annihilation gamma rays generated by the positron source in such a state are used to measure a time difference between the output signals output from both radiation detectors 60. Such a method allows measuring a temporal fluctuation between a pair of radiation detectors when one radiation detector is used as a reference. This temporal fluctuation corresponds to a temporal resolution.

The method for measuring the detection efficiency will be described in detail. By measuring a total count value when replacing scintillators different in shape as described above while measuring in the same time period, a relative detection efficiency can be measured. In this case, the distance from the positron source to the radiation incident surface 62a of the scintillator 62 is set fixed.

Figure 6:
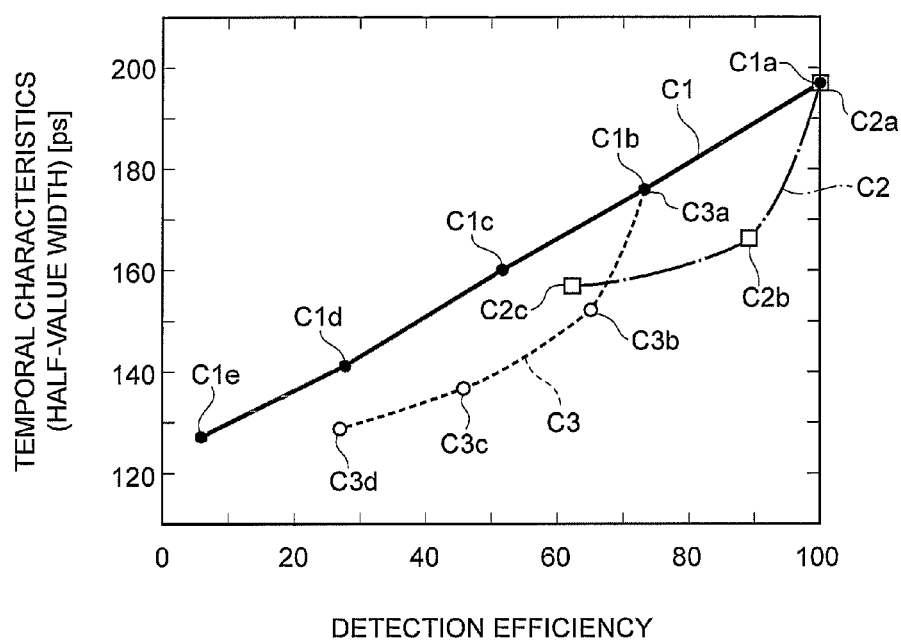
FIG. 6 is a chart for explaining correlations between the detection efficiency and temporal characteristics of the conventional radiation detectors.

FIG. 6 is a chart showing the relationships between the detection efficiency and temporal characteristics obtained by carrying out the measurement of temporal characteristics and detection efficiency described above for each of the scintillators 62 having different shapes and dimensions. The curve C1 in FIG. 6, which is a result obtained in the case of a scintillator having a rectangular parallelepiped-like shape (hereinafter, referred to as a rectangular parallelepiped scintillator), shows the relationship between the relative detection efficiency (where the detection efficiency of a scintillator in a shape with S=20 mm and L=25 mm was provided as 100) and temporal characteristics when the length L (length in the incident direction of a radiation) of the rectangular parallelepiped scintillator was changed. The curve C2 in FIG. 6 shows the relationship between the detection efficiency and temporal characteristics when the length L of the scintillator 62 was fixed and the length of each side S of the incident surface 62a was changed in the scintillator 62 shown in FIG. 5. The curve C3 in FIG. 6 shows the relationship between the detection efficiency and temporal characteristics when the length L of the scintillator 62 was set to a fixed length different from that of the curve C2 and the length of each side S of the incident surface 62a was changed in the scintillator 62 shown in FIG. 5.

Further, the point C1a on the curve C1 shows characteristics of a rectangular parallelepiped scintillator having a shape with S=20 mm and L=25 mm, the point C1b on the curve C1 shows characteristics of a rectangular parallelepiped scintillator having a shape with S=20 mm and L=20 mm, and the point C1c on the curve C1 shows characteristics of a rectangular parallelepiped scintillator having a shape with S=20 mm and L=15 mm. The point C1d on the curve C1 shows characteristics of a rectangular parallelepiped scintillator having a shape with S=20 mm and L=10 mm, and the point C1e on the curve C1 shows characteristics of a rectangular parallelepiped scintillator having a shape with S=20 mm and L=5 mm. The point C2a on the curve C2 shows characteristics of a scintillator 62 having a shape with S=20 mm and L=25 mm, the point C2b on the curve C2 shows characteristics of a scintillator 62 having a shape with S=15 mm and L=25 mm, and the point C2c on the curve C2 shows characteristics of a scintillator 62 having a shape with S=10 mm and L=25 mm. The point C3a on the curve C3 shows characteristics of a scintillator 62 having a shape with S=20 mm and L=20 mm, the point C3b on the curve C3 shows characteristics of a scintillator 62 having a shape with S=15 mm and L=20 mm, the point C3c on the curve C3 shows characteristics of a scintillator 62 having a shape with S=10 mm and L=20 mm, and the point C3d on the curve C3 shows characteristics of a scintillator 62 having a shape with S=5 mm and L=20 mm.

It can be understood by confirming the curve C1 that, in the rectangular parallelepiped scintillator, when the length L is reduced, the temporal characteristics are improved because the optical path from a scintillation light generating point to the photodetector 61 is shortened. On the other hand, it can be understood that the detection efficiency declines because the volume of the rectangular parallelepiped scintillator is reduced. On the other hand, it can be understood by confirming the curve C2 and the curve C3 that, in the scintillator 62 that is in a truncated pyramid shape, when the side S of the incident surface 62a is reduced, the detection efficiency declines because the volume of the scintillator 62 is reduced, but there are improved temporal characteristics.

It can be understood by comparing the curve C1 and the curve C2 that the margin of decline in detection efficiency when the temporal characteristics are improved is smaller in the curve C2 than in the curve C1. It can also be understood when the curve C1 and the curve C3 are compared that the margin of decline in detection efficiency when the temporal characteristics are improved is smaller in the curve C2 than in the curve C1. Therefore, it can be understood that providing, as a means for improving the temporal characteristics, the scintillator shape as a truncated pyramid shape like the scintillator 62 is one of the effective means.

Figure 7:
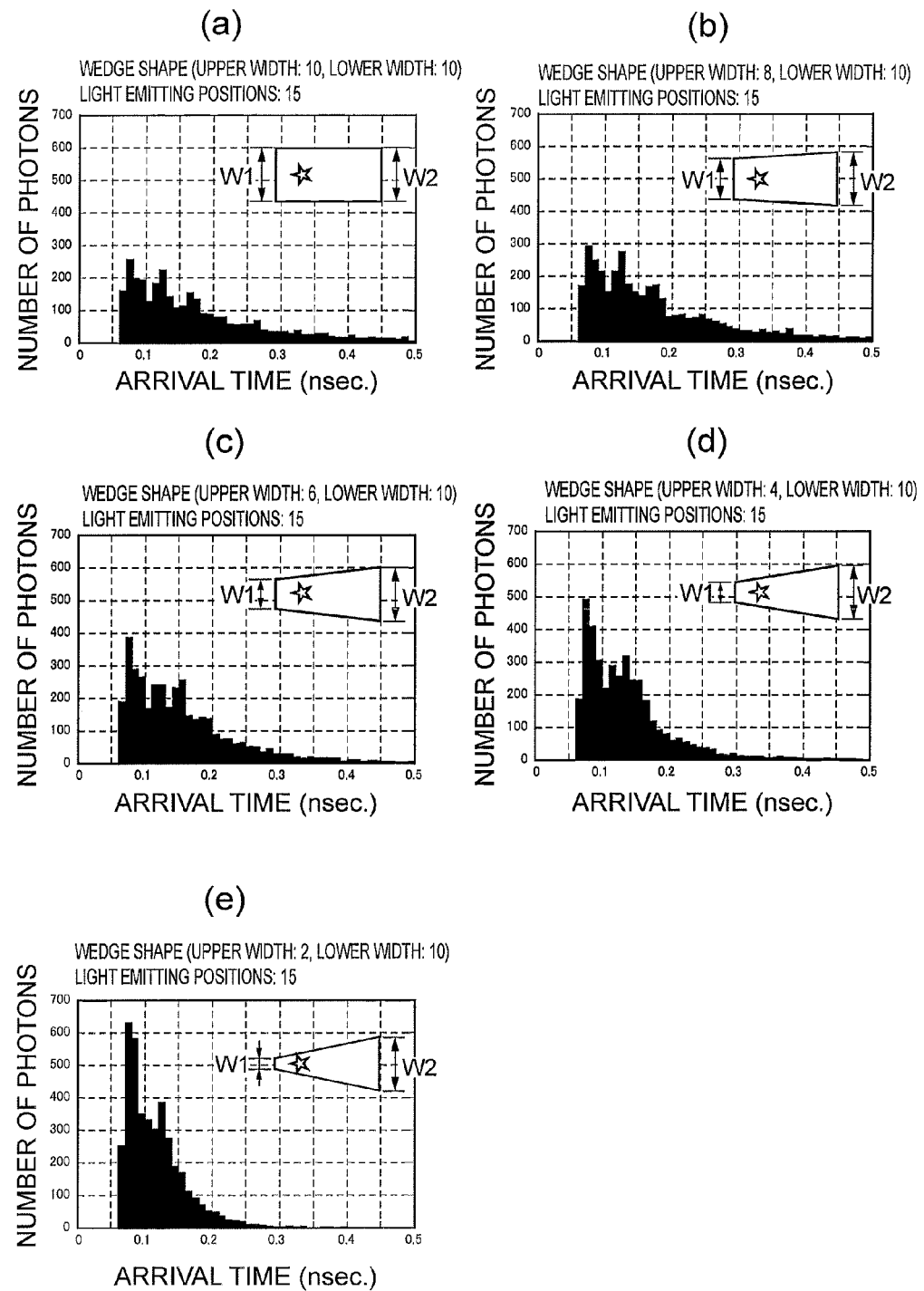
FIG. 7 includes charts (a) to (e) for explaining correlations between the scintillator shape and temporal characteristics.

Further, the relationships between the shapes of scintillators and the temporal characteristics of scintillators were confirmed in detail by simulation. FIGS. 7(a) to (e) are graphs each showing the time where scintillation light arrived at an end face and the number of photons thereof. FIG. 7(a) shows a result in the case of a scintillator having, for example, a rectangular parallelepiped shape. FIGS. 7(b) to (e) show results in the cases of, for example, scintillators having truncated pyramid shapes like the scintillator 62. The "upper width" shown in FIGS. 7(a) to (e) corresponds to the width W1 of an incident surface of the scintillator, and the "lower width" corresponds to the width W2 of a back surface located on the opposite side to the incident surface. When the width W1 is smaller than the width W2, this means that the area of the incident surface is smaller than the area of the back surface. It is assumed that light was generated in all directions at the position of the star in the scintillator shown in each figure. It can be understood by confirming FIGS. 7(a) to (e) that the smaller the area of the incident surface compared to the area of the back surface, the more photons arrived at the end face in a shorter time. Therefore, it can also be understood from these simulation results that providing, as a means for improving temporal characteristics, the scintillator shape as a truncated pyramid shape like the scintillator 62 is one of the effective means.

Next, the operation and effects of the above-described radiation detector 1 will be described. The radiation detector 1 according to the present embodiment includes a plurality of light emitting regions 11a, 11b having, for example, truncated pyramid shapes, wedge shapes, or other tapered shapes. Because the effects as described by using FIG. 5 to FIG. 7 can therefore be provided, the temporal characteristics can be improved. Further, each scintillator cell 11 can maintain a substantial volume of the volumes of both of the light emitting regions 11a, 11b added up. Therefore, a decline in detection efficiency can be suppressed. Consequently, the radiation detector 1 by the present embodiment allows realizing excellent temporal characteristics without a decline in detection efficiency.

A rectangular parallelepiped scintillator has a plurality of sets of mutually parallel side surfaces. In such a configuration, when it becomes a condition such that scintillation light reflects between the mutually parallel side surfaces, reflection at the same reflection angle is repeated. Therefore, the arrival path to the photodetector is elongated to have a large variation in arrival time depending on the difference in the path. Particularly, in the case of a condition such that scintillation light reflects on the incident surface of the photodetector, reflection in the scintillator under this condition is repeated until the scintillation light has attenuated due to absorption and reflection loss in the scintillator. The light emitting region 11a, 11b included in the radiation detector 1 by the present embodiment has a shape tapering from the end face 11e, 11g toward the tip 11c, 11d. That is, there is an arrangement so that one of the side surfaces that compose the light emitting region 11a, 11b becomes a sloping surface inclined toward the photodetector 21, 31. Such an arrangement breaks the continuous reflection condition that can possibly occur in a rectangular parallelepiped scintillator. Moreover, the incident angle on the incident surface of the photodetector 21, 31 has a deeper angle. That is, the incident angle of scintillation light shifts to a nearly vertical angle with respect to the incident surface. Accordingly, the rate that scintillation light is reflected on the incident surface of the photodetector 11a, 11b is reduced to make the arrival path shorter and reduce variation in arrival time, so that the radiation detector 1 can have excellent temporal characteristics. Further, because the scintillator cells 11 can be considered to have a two-stage arrangement in the radial direction of a detector ring (corresponding to the circle C shown in FIG. 1) of the TOP PET TOF-PET device 100, it becomes possible to collect DOI information (DOI: Depth Of Interaction). Further, because it can be considered that two scintillator cells 11 are present shifted in the circumferential direction of a detector ring (corresponding to the circle C shown in FIG. 1) of the TOF-PET device 100, the sampling density can be improved.

Moreover, because there is provided a reflecting region 13 on the side surface 10c of the scintillator array 10, it becomes possible to efficiently collect scintillation light generated in the scintillator cells 11 into the photodetectors 21, 31. Therefore, the radiation detector 1 can have excellent energy detection characteristics (energy resolution). Further, in the scintillator array 10, because there is provided a reflecting region 14, it becomes possible to prevent leakage of scintillation light to a different scintillator cell 11 adjacent to a scintillator cell 11 in which the scintillation light has been generated. Therefore, the radiation detector 1 can have excellent position detection characteristics.

Figure 8:
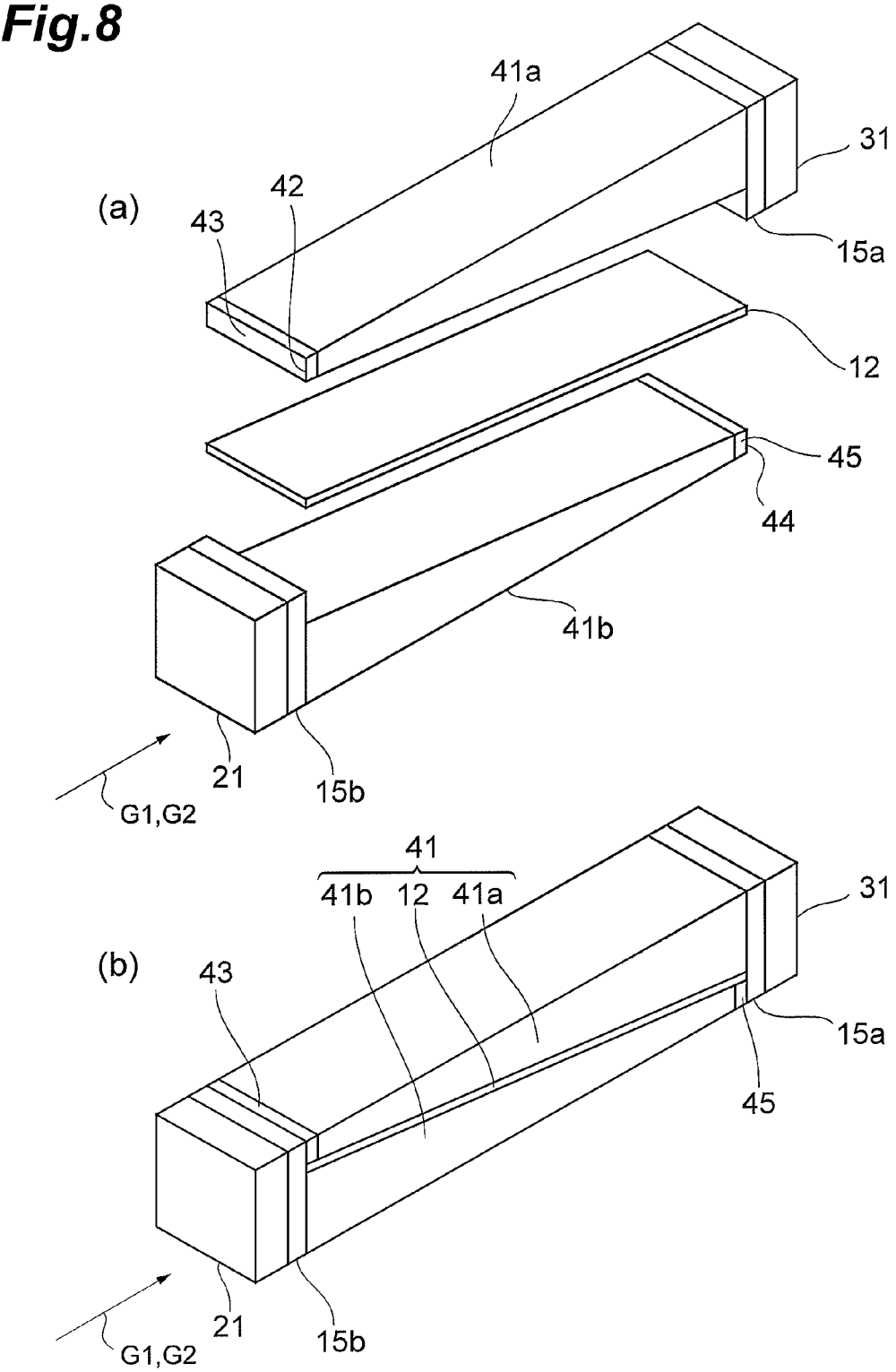
FIG. 8 includes views for explaining a modification of the radiation detector according to the present embodiment.

The radiation detector 1 is not limited to the embodiments and examples described above, and various other modifications can be made. FIG. 8(a) and FIG. 8(b) are views showing a modification of the embodiment described above. As shown in FIG. 8(a) and FIG. 8(b), the light emitting region 41a of a scintillator cell 41 may be in a shape that an end face 42 is formed at the tip located on the opposite side to the surface to which the photodetector 31 is coupled by the optical coupling portion 15a. On this end face 42, a reflecting region 43 is provided. Similarly, the light emitting region 41b may be in a shape that an end face 44 is formed at the tip located on the opposite side to the surface to which the photodetector 21 is coupled by the optical coupling portion 15b. On this end face 44, a reflecting region 45 is provided. Doing this allows easily profiling the light emitting region 41a and the light emitting region 41b.

Figure 9:
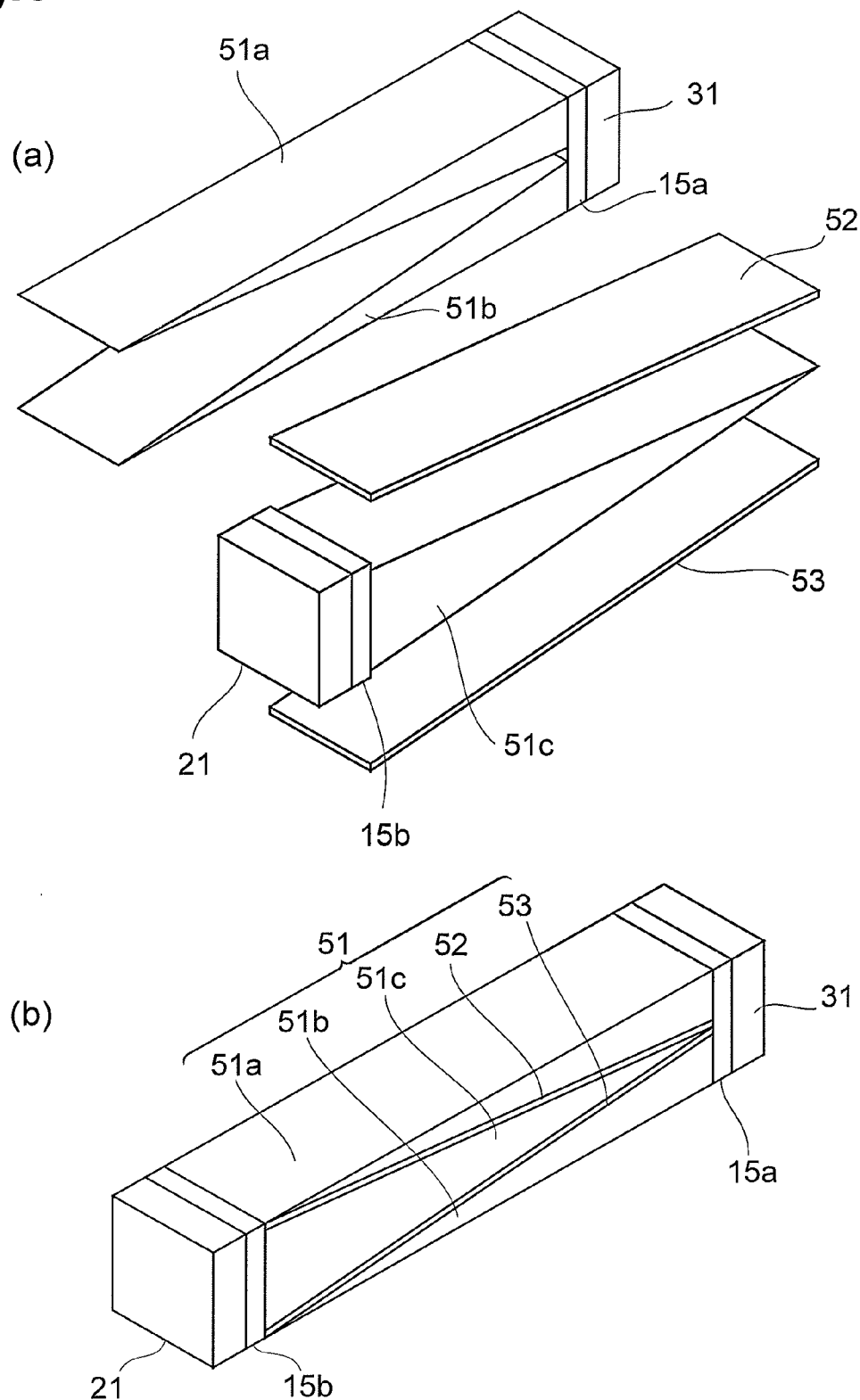
FIG. 9 includes views for explaining another modification of the radiation detector according to the present embodiment.

Moreover, FIG. 9(a) and FIG. 9(b) are views showing another modification of the embodiment described above. As shown in FIG. 9(a) and FIG. 9(b), the scintillator cell 51 may be separated into three light emitting regions by a reflecting region 52 and a reflecting region 53. In this case, the scintillator cell 51 is separated into a light emitting region 51a, a light emitting region 51b, and a light emitting region 51c. And, the light emitting region 51a and the light emitting region 52b are optically coupled to the photodetector 31 by the optical coupling portion 15a. Moreover, the light emitting region 51c is optically coupled to the photodetector 21 by the optical coupling portion 15b.

EXAMPLE

Detectors for which rectangular parallelepiped LYSO scintillators were coupled to MPPCs were fabricated, and detectors for which wedge-shaped LYSO scintillators were coupled to MPPCs were further fabricated. Also, for the reflective material, a Teflon tape (Teflon is a registered trademark) was used. Then, the temporal resolutions of the respective detectors were measured by using reference detectors for which photomultiplier tubes were coupled to BaF2 scintillators. As a result, the temporal resolution of the detectors including rectangular parallelepiped LYSO sciintillators was 324 picoseconds. On the other hand, the temporal resolution of the detectors including wedge-shaped LYSO sciintillators was 279 picoseconds. Therefore, forming scintillators in wedge shapes could improve the temporal resolution by 45 picoseconds.

INDUSTRIAL APPLICABILITY

The present invention is applicable to a radiation detector by which excellent temporal characteristics are realized without a decline in detection efficiency.

REFERENCE SIGNS LIST 1, 60 . . . radiation detector, 1a . . . set, 10 . . . scintillator array, 10a . . . incident surface, 10b . . . back surface, 10c . . . side surface, 11, 41, 51 . . . scintillator cell, 11a, 11b, 41a, 41b, 51a, 51b, 51c . . . light emitting region, 11c, 11d . . . tip portion, 11e, 11g, 42, 44 . . . end face, 12, 13, 14, 43, 45, 52, 53 . . . reflecting region, 15a, 15b . . . optical coupling portion, 20, 30 . . . photodetector array, 21, 31, 61 . . . photodetector, 62 . . . scintillator, 62a . . . incident surface, 100 . . . PET device, 101 . . . radiation detector array, 102a, 102b . . . preamplifier, 103A1, 103A2, 103B1, 103B2 . . . summing amplifier, 104 . . . energy discrimination circuit, 105A, 105B . . . timing pick-off circuit, 106 . . . coincidence counting circuit, G . . . gamma ray pair, G1, G2 . . . gamma ray, P . . . measuring object, C1 to C4 . . . curve, SH . . . threshold.

The invention claimed is:

1. A radiation detector array for a TOF-PET (Time of Flight—Positron Emission Tomography) device that is configured to be able to collect DOI (Depth of Interaction) information, the radiation detector array comprising:
a radiation detector set that performs coincidence counting, the radiation detector set including a pair of radiation detectors disposed on a circumference of a circle substantially centered on a measuring object, the radiation detectors of the pair being located on opposite sides of the circle across the measuring object, wherein each of the radiation detectors comprises:
a scintillator array including an incident surface on which a radiation is incident, a back surface located on a side opposite to the incident surface, and a plurality of scintillator cells which are arrayed two-dimensionally on the incident surface;
a first photodetector array which is provided on the incident surface; and
a second photodetector array which is provided on the back surface;
the scintillator array is provided between the first photodetector array and the second photodetector array;
the first photodetector array has a plurality of first photodetectors which are arrayed two-dimensionally along the incident surface;
the second photodetector array has a plurality of second photodetectors which are arrayed two-dimensionally along the back surface;
the first and second photodetectors are radiation-transmissive photodetectors, and at least the first photodetectors are each configured to receive and transmit gamma rays; and
each of the scintillator cells includes a plurality of light emitting regions which absorb an incident radiation and generate scintillation light, and a first reflecting region which is configured to reflect the scintillation light generated by a first one of the light emitting regions.

2. The radiation detector array according to claim 1, wherein, for each of the scintillator cells, one of the first photodetectors is configured to receive and detect the scintillation light reflected by the first reflecting region.

3. The radiation detector array according to claim 1, wherein, in each scintillator cell, the first reflecting region is configured to receive and transmit gamma rays.

4. The radiation detector array according to claim 1, wherein each scintillator cell has a rectangular parallelepiped-like shape extending between the incident surface and the back surface, and is separated into the plurality of light emitting regions by the first reflecting region.

5. The radiation detector array according to claim 1, wherein each scintillator cell has a two-stage arrangement of the light emitting regions in a radial direction of a detector ring of the TOF-PET device, thereby making enabling collection of the DOI information.

6. The radiation detector array according to claim 5, wherein the scintillator cells are positionally shifted from one another so that the scintillator cells are located at different positions around a circumferential direction of the detector ring.

7. The radiation detector array according to claim 1, wherein, in each scintillator cell, the first reflecting region extends between the incident surface side and the back surface side along a surface Which is inclined with respect to the incident surface and the back surface.

8. The radiation detector array according to claim 1, wherein each of the plurality of light emitting regions is optically coupled to one of the first photodetector array and the second photodetector array.

9. The radiation detector array according to claim 1, wherein each light emitting region has an end face and a tip located on a side of the light emitting region that is opposite to the end face, and a wedge shape tapering from the end face toward the tip.

10. The radiation detector array according to claim 9, wherein the end face is included in the incident surface or the back surface, and is optically coupled with either one of the first photodetector and the second photodetector.

11. The radiation detector array according to claim 10, wherein, in each scintillator cell, a length of each light emitting region in the radial direction of the detector ring is longer than that of each side of the end face in a direction intersecting the radial direction.

12. The radiation detector array according to claim 11, wherein, in adjacent light emitting regions of each scintillator cell, both the end face of one light emitting region and the tip of the other light emitting region are disposed on the same incident surface or same back surface.

13. The radiation detector array according to claim 12, wherein the radiation from the measuring object is incident on the end face included in the incident surface through the first photodetector.

14. The radiation detector array according to claim 1, wherein
the scintillator array has a side surface and a second reflecting region which reflects the scintillation light,
the side surface extends between the incident surface and the back surface, and
the second reflecting region has a first part which is located on the side surface and covers the side surface and a second part which separates the scintillator array into the plurality of scintillator cells.

15. A radiation detector array for a TOF-PET (Time of Flight—Positron Emission Tomography) device that is configured to be able to collect DOI (Depth of Interaction) information, the radiation detector array comprising:
a radiation detector set that performs coincidence counting, the radiation detector set including a pair of radiation detectors disposed on a circumference of a circle substantially centered on a measuring object, the radiation detectors of the pair being located on opposite sides of the circle across the measuring object, wherein each of the radiation detectors comprises:
a scintillator array including an incident surface on which a radiation is incident, a back surface located on a side opposite to the incident surface, and a plurality of scintillator cells which are arrayed two-dimensionally on the incident surface;
a first photodetector array which is provided on the incident surface; and a second photodetector array which is provided on the back surface;

the scintillator array is provided between the first photodetector array and the second photodetector array;

the first photodetector array has a plurality of first photodetectors which are arrayed two dimensionally along the incident surface;

the second photodetector array has a plurality of second photodetectors Which are arrayed two-dimensionally along the back surface;

the first and second photodetectors are radiation-transmissive photodetectors, and at least the first photodetectors are each configured to receive and transmit gamma rays;

each of the scintillator cells includes a plurality of light emitting regions which absorb an incident radiation and generate scintillation light, and a first reflecting region which is configured to reflect the scintillation light generated by a first one of the light emitting regions;

for each scintillator cell, one of the first photodetectors is configured to receive and detect the scintillation light reflected by the first reflecting region;

in each scintillator cell, the first reflecting region is configured to receive and transmit gamma rays that have passed through one of the first photodetectors and the first light emitting region to a second one of the light emitting regions, and to reflect the scintillation light generated by the second light emitting region; and for each scintillator cell, one of the second photodetectors is configured to receive and detect the scintillation light generated by the second light emitting region after the scintillation light generated by the second light emitting region has been reflected by the first reflecting region.

* * * * *